United States Patent [19]
Kasper

[11] 3,944,088
[45] Mar. 16, 1976

[54] MACHINE AND PROCESS FOR HANDLING CATHODE PLATES OR THE LIKE

[75] Inventor: Cass S. Kasper, Grosse Point, Mich.
[73] Assignee: Inter-Lakes Engineering Co., Mount Clemens, Mich.
[22] Filed: Mar. 3, 1975
[21] Appl. No.: 554,974

[52] U.S. Cl. ................... 214/89; 198/221; 214/152
[51] Int. Cl.² ......................................... B65G 49/00
[58] Field of Search ....... 214/38 CC, 89, 90 R, 152; 198/20 R, 221

[56] References Cited
UNITED STATES PATENTS
3,250,369   5/1966   Pianowski et al. ................... 198/221
3,792,891   2/1974   Kasper ............................... 294/67 R Primary Examiner—Robert G. Sheridan
Attorney, Agent, or Firm—Harness, Dickey & Pierce

[57] ABSTRACT

Cathode plates with suspension bars are advanced in close formation on a pair of spaced parallel rails. At the same time, a multi-tiered bolster is moved on rollers and positioned beneath the rail. When the rails are full, they are lowered until the suspension bars rest on successive tiers of the bolster. The bolster is then rolled away and the rails lifted.

9 Claims, 4 Drawing Figures

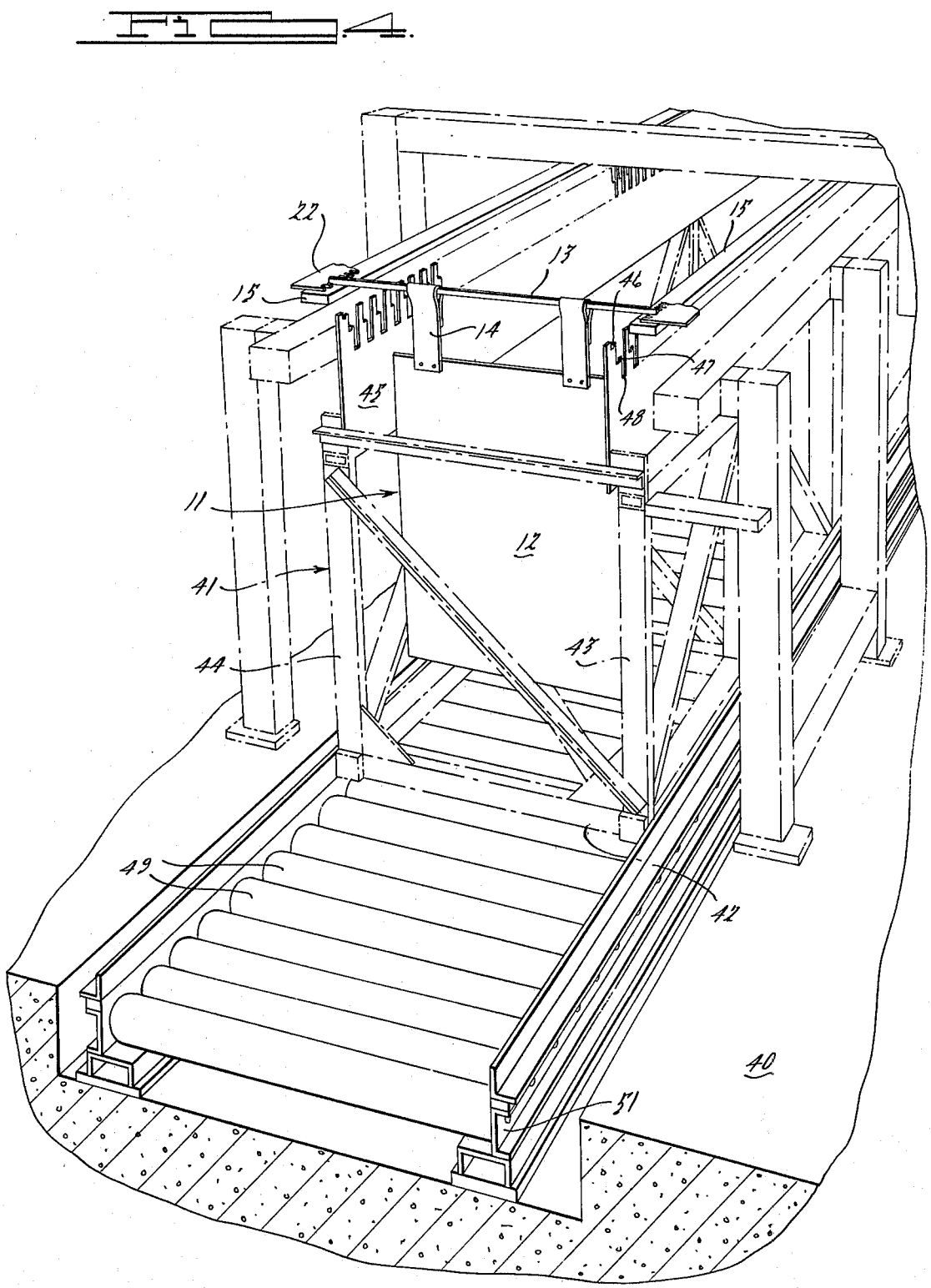

MACHINE AND PROCESS FOR HANDLING CATHODE PLATES OR THE LIKE

BACKGROUND OF THE INVENTION

The invention relates to the handling of cathode plates or the like. An example is pure copper plates carried by suspension bars and used for the electrolytic refining of copper. Conventionally, the accumulated assemblies comprising the cathodes and suspension bars are initially closely spaced, but it is desired to increase this spacing for placing the cathodes in the electrolytic bath. A known means for providing this spacing is a multi-tiered rack or bolster onto which each group of closely spaced assemblies is lowered.

DESCRIPTION OF THE PRIOR ART

U.S. Pat. No. 3,792,891 issued Feb. 19, 1974 describes a pickup unit which lifts groups of closely spaced assemblies off slide rails in conjunction with a crane so that they may be carried to and lowered onto the bolster. Aside from the need for a crane and allied equipment, this prior pickup unit is time-consuming in that each group of cathode assemblies must be transported to a separate location in the plant.

BRIEF SUMMARY OF THE INVENTION

It is an object of the present invention to provide a novel and improved machine and process for accumulating and loading cathode plates or the like which eliminates the need for a crane or similar extraneous equipment.

It is another object to provide improved method and means of this nature which greatly increases the speed with which groups of cathode assemblies may be handled, and reduces the necessary plant floor space for this operation.

Briefly, the machine of this invention comprises a pair of spaced parallel slide rails, means for intermittently advancing and accumulating a group of workpieces suspended between said rails, a bolster for receiving said workpieces, means for conveying said bolster between a loading position between and below said rails and a second position longitudinally spaced from and clear of said rails, and means supporting said rails for simultaneous vertical movement between an upper position in which the workpieces may be advanced thereon by said advancing means, and a lower position in which said workpieces are loaded onto said bolster and said rails are below the lowermost workpiece portions resting on said bolster.

The process of this invention comprises the steps of providing a pair of spaced parallel rails, intermittently advancing and accumulating a group of workpieces suspended between said rails, positioning a bolster beneath said accumulating workpieces, simultaneously lowering said rails until the workpieces rest on said bolster and the rails are below the lowest workpiece portions resting on said bolster, moving said bolster longitudinally until it is clear of said rails, and raising said rails to their original position.

BRIEF DESCRIPTION OF THE DRAWINGS

FIG. 4 is a perspective view of the bolster.

DESCRIPTION OF THE PREFERRED EMBODIMENT

Figure 1:
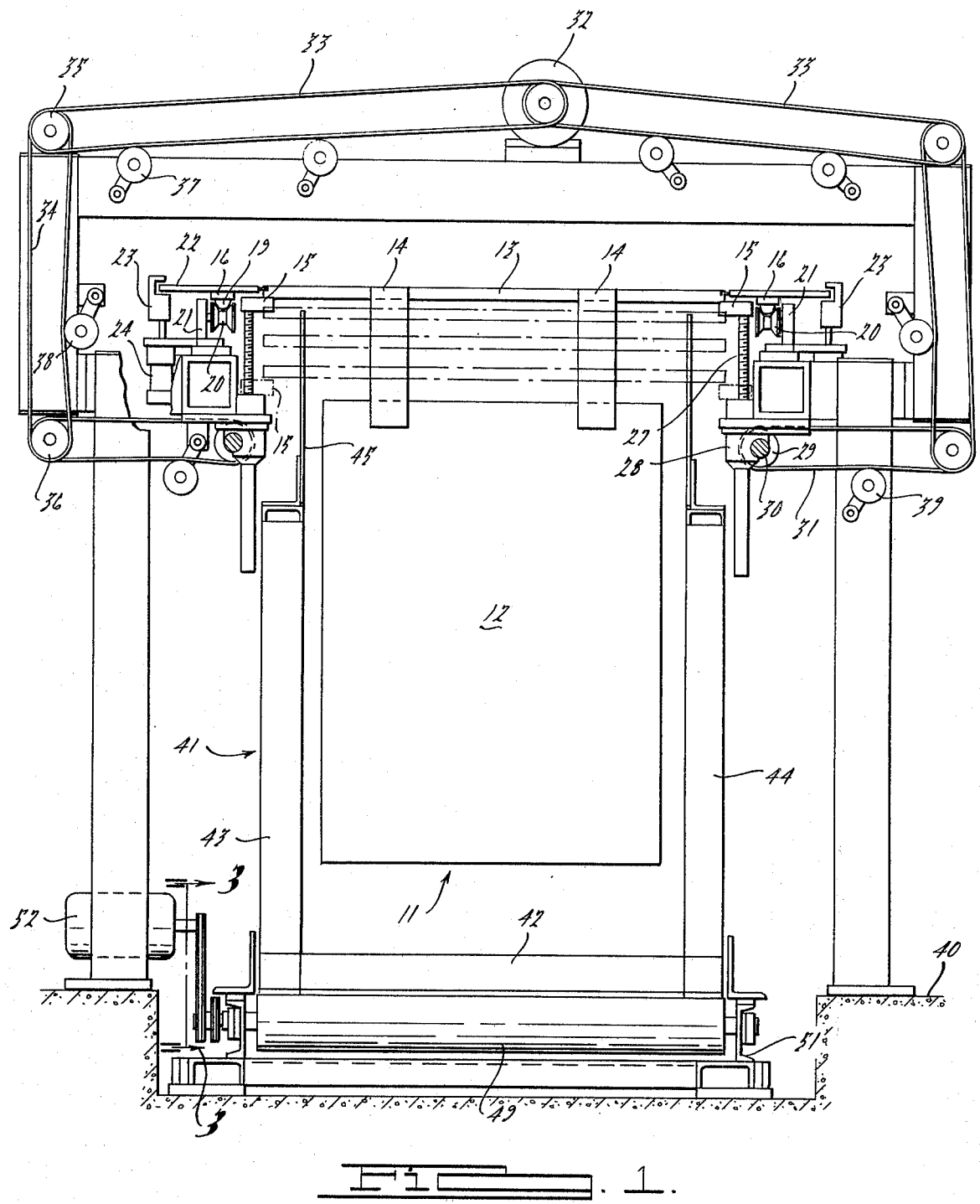
FIG. 1 is an end elevational view, partially schematic, showing the invention.

The invention is intended to handle cathode assemblies of the type shown in the figures, or similar workpieces. Each assembly is indicated generally at 11 and comprises a rectangular plate 12 of pure copper and a suspension bar 13 thereabove. The plate is attached to the suspension bar by a pair of straps 14 which are looped over the bar and lanced or otherwise attached to the plate. The suspension bars 13 are long enough to extend beyond the opposite side edges of plate 12.

A pair of spaced parallel slide rails 15 are provided for receiving and accumulating assemblies 11 in closely spaced relation. The rails are so spaced that they will be engageable by the outer ends of bars 13 with straps 14 and plate 12 hanging down between and below the rails.

Figure 2:
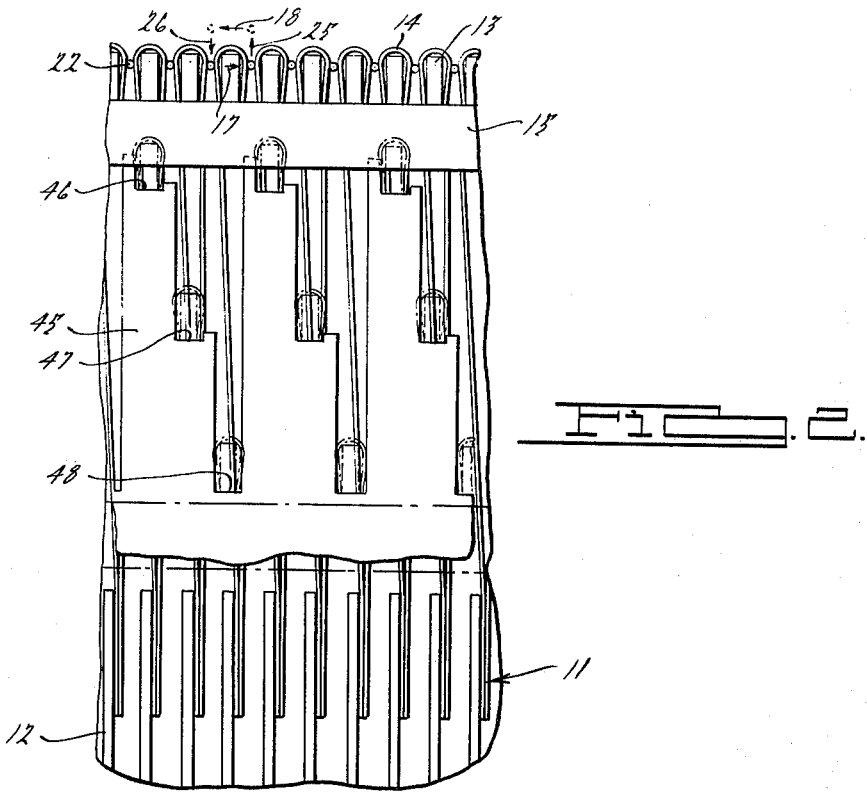
FIG. 2 is a fragmentary side elevational view showing the operation of the advancing and accumulating means and the manner in which the assemblies rest on the bolster.
Figure 3:
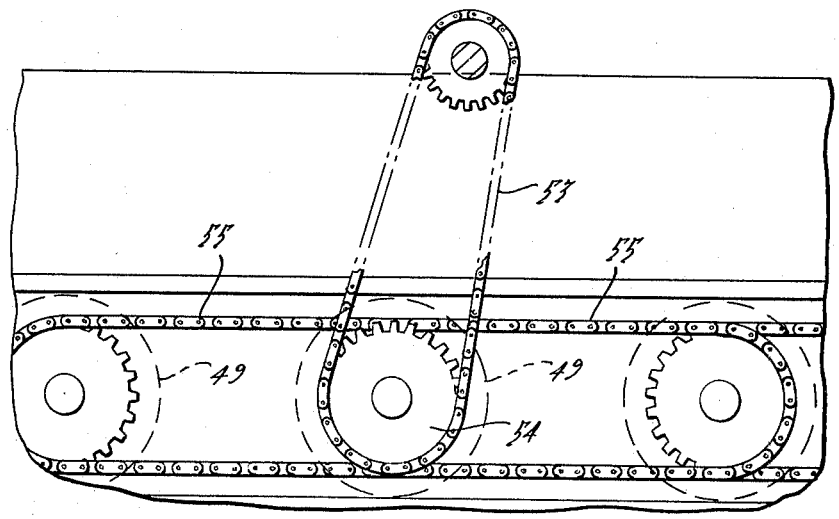
FIG. 3 is a fragmentary side elevational view of the bolster conveyor driving means, taken along the line 3—3 of FIG. 1.

The means for intermittently advancing assemblies 11 comprises a pair of transfer bars 16 alongside and outwardly of rails 15 and reciprocable by motor means, such as pistons and cylinders, indicated schematically by the horizontal arrows 17 and 18 in FIG. 2. These bars are supported by their rounded bottoms 19 on a plurality of grooved rollers 20, the rollers thus also permitting rocking movement of bars 16. Rollers 20 are rotatably supported by uprights 21 spaced along bars 16. The bars carry closely spaced fingers 22 the inner ends of which are disposable between suspension bars 13 when the fingers are in their horizontal positions as shown in lines in FIG. 1. Fingers 22 also extend outwardly from bars 16 and actuators 23 are provided which have recesses within which the outer ends of fingers 22 are disposed. These actuators are vertically reciprocable by motors 24, between an upper position as shown in FIG. 1 and a lowered position. In a suitable construction, fingers 22 may be formed in sets, with each set being on a plate, and a plurality of actuators 23 are provided on each side of the unit, each actuator recess receiving the outer edge of a plate.

In operation of the advancing and accumulating means, starting from an initial position shown in FIG. 1, the fingers will be disposed between the assembly suspension bars. Upon advancing of bars 16 to the right as shown by arrow 17 of FIG. 2 (outwardly from the paper in FIG. 1) all assemblies 11 will be advanced one space, and a new assembly will be added at the starting end. Actuators 23 are then lowered so that the inner ends of fingers 22 will be raised as shown by arrow 25 in FIG. 2. Bars 16 will then be retracted as shown by arrow 18 with the fingers clear of assemblies 13. Actuators 23 will then be raised and the fingers will descend as shown by arrow 26 in FIG. 2 until they are positioned in the following space. This operation will continue until a full load of assemblies 11 has been accumulated on rails 15.

Means are provided for lowering rails 15 from their solid line position as shown in FIG. 1 to their dot-dash line position. This means includes a plurality of threaded posts 27 on which each rail is mounted, each post being part of a screw-and-nut assembly 28. The nut is rotatable by a worm and a worm wheel or other gear drive 29 driven by a jack shaft 30 which extends parallel to bar 16 and is rotated by a chain 31. The chain is driven from a motor 32 mounted on a framework above rails 15. Motor 32 drives a pair of chains 33 leading to opposite sides of the framework, these driving vertically extending chains 34 through pulleys 35. The lower ends of chains 34 drive pulleys 36 which are connected to chains 31. Take-up rollers 37, 38 and 39 are provided for chains 33, 34 and 31 respectively. The above-described parts may be supported by various portions of the framework, which rests on floor 40.

A bolster generally indicated at 41 is provided for receiving a group of assemblies 11. This bolster is of conventional U-shaped construction, having a base 42 and side members 43 and 44. The side members carry multi-tiered racks 45 (FIGS. 2 and 4) which in this case have three levels 46, 47 and 48. With this arrangement, a group of cathode plate assemblies with, for example, one-inch spacing on rails 15 will be divided by the bolster into three groups having three inch spacings.

Means are provided for moving bolster 41 into and out of a position underneath rails 15. This means includes a plurality of rollers 49 below and extending transversely between rails 15. The opposite ends of these rollers are supported for rotation by a frame 51. A motor 52 is provided for simultaneously rotating rollers 49 in either of opposite directions. The motor is connected by an endless chain 53 to a gear 54 fixed to the shaft of one roller 49, this roller being connected to the others by chains 55. Bolster 41 rests on rollers 49 and may therefore be moved into and out of position in a direction parallel to rails 15. The height of tiers 45 on bolster 41 is such that the bolster will be slightly below the level of suspension bars 13 when they rest on rails 15. The spacing between the sides of the bolster is such that it may be rolled into position with the tiers on opposite sides of plates 12 and beneath the suspension bars.

In operation, after a complete group of assemblies 11 has been moved onto rails 15 by fingers 22, the rails will be lowered by motor 32 until they reach their dot-dash line positions in FIG. 1. At this time the group of cathode plate assemblies will have been completely loaded onto racks 45 of bolster 41, the bolster having previously been positioned beneath the assemblies. After rails 15 have been lowered sufficiently to clear the lowermost suspension bars, bolster 41 will be moved longitudinally away from the rails by motor 52 and conveyor rollers 49. Rails 15 may then be raised in readiness for another group of cathode plate assemblies.

I claim:

1. A workpiece handling machine comprising a pair of spaced parallel slide rails, means for intermittently advancing and accumulating a group of workpieces suspended between said rails, a bolster for receiving said workpieces, means for conveying said bolster between a loading position between and below said rails and a second position longitudinally spaced from and clear of said rails, and means supporting said rails for simultaneous vertical movement between an upper position in which the workpieces may be advanced thereon by said advancing means, and a lower position in which said workpieces are loaded onto said bolster and said rails are below the lowermost workpiece portions resting on said bolster.

2. The combination according to claim 1, said means for advancing and accumulating said workpieces comprising a pair of transfer bars outside and parallel to said rails, a plurality of fingers carried by each transfer bar and extending inwardly toward and above said rail, means for longitudinally reciprocating said transfer bars and means for rocking said transfer bars, whereby said fingers may be moved sequentially between a first position disposed between said workpieces, a second position above said workpieces, a third position retracted to the next space between said workpieces but thereabove, and a fourth position lowered into said next spaces.

3. The combination according to claim 2, further provided with rollers supporting said transfer bars for said axial and rocking movement, said means for actuating said fingers and transfer bars comprising actuators engageable with outwardly extending portions of said fingers, and means for vertically reciprocating said actuator.

4. The combination according to claim 3, said fingers being in sets with each set being on a plate, said actuator having recesses receiving the outer edges of said plates.

5. The combination according to claim 1, said rail supporting means comprising screw and nut mechanisms, and means for driving each mechanism comprising a motor and chain means connecting said motor to said screw and nut mechanism.

6. The combination according to claim 5, each screw and nut mechanism including a screw shaft supporting said rail, each rail being supported by a plurality of such screw shafts along its length.

7. The combination according to claim 1, said bolster conveying means comprising a plurality of transversely extending rollers beneath and extending away from said rails, and means for driving said rollers in either of opposite directions, said bolster having a base resting on said rollers.

8. The combination according to claim 7, said bolster comprising said base, side members extending upwardly from said base, and multi-tiered side racks mounted on said side members.

9. A method of handling workpieces comprising the steps of providing a pair of spaced parallel rails, intermittently advancing and accumulating a group of workpieces suspended between said rails, positioning a bolster beneath said accumulating workpieces, simultaneously lowering said rails until the workpieces rest on said bolster and the rails are below the lowest workpiece portions resting on said bolster, moving said bolster longitudinally until it is clear of said rails, and raising said rails to their original position.

\* \* \* \* \*